(12) United States Patent
Kawamoto et al.

(10) Patent No.: US 10,514,095 B2
(45) Date of Patent: Dec. 24, 2019

(54) CONTROL DEVICE AND CONTROL METHOD FOR CONTINUOUSLY VARIABLE TRANSMISSION MECHANISM FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Yoshinobu Kawamoto, Seoul (KR); Norio Asai, Atsugi (JP); Hiroyasu Tanaka, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 109 days.

(21) Appl. No.: 15/757,473

(22) PCT Filed: Sep. 6, 2016

(86) PCT No.: PCT/JP2016/076066
§ 371 (c)(1),
(2) Date: Mar. 5, 2018

(87) PCT Pub. No.: WO2017/043458
PCT Pub. Date: Mar. 16, 2017

(65) Prior Publication Data
US 2018/0245691 A1    Aug. 30, 2018

(30) Foreign Application Priority Data

Sep. 9, 2015 (JP) .................................. 2015-177961

(51) Int. Cl.
*F16H 59/22* (2006.01)
*F16H 61/662* (2006.01)
(Continued)

(52) U.S. Cl.
CPC .......... *F16H 61/662* (2013.01); *F16H 3/663* (2013.01); *F16H 9/18* (2013.01); *F16H 37/022* (2013.01);
(Continued)

(58) Field of Classification Search
None
See application file for complete search history.

(56) References Cited

U.S. PATENT DOCUMENTS 4,730,522 A * 3/1988 Morimoto ......... F16H 61/66259
477/47
5,569,114 A * 10/1996 Matsuda ........... F16H 61/66272
477/45

(Continued)

FOREIGN PATENT DOCUMENTS

JP    H11-082707 A    3/1999

*Primary Examiner* — Dirk Wright
(74) *Attorney, Agent, or Firm* — Foley & Lardner LLP

(57) ABSTRACT

A control device for a continuously variable transmission mechanism of a vehicle includes: a stepwise variable transmission mechanism which is disposed in series with the continuously variable transmission mechanism, and which has at least two or more forward gear stages; and a controller configured to increase the belt capacities to be greater than the belt capacity set when an accelerator opening degree is zero, at least in a time period from a timing when the accelerator opening degree becomes zero, to a timing when a braking force is generated by a depression of a brake pedal, the controller being configured to set an increase amount with respect to the belt capacity set when the accelerator opening degree is zero, to a smaller value as a transmission gear ratio of the stepwise variable transmission mechanism is higher.

5 Claims, 7 Drawing Sheets

(51) Int. Cl.
  *F16H 59/54* (2006.01)
  *F16H 61/02* (2006.01)
  *F16H 59/70* (2006.01)
  *F16H 3/66* (2006.01)
  *F16H 9/18* (2006.01)
  *F16H 37/02* (2006.01)
  *F16H 61/00* (2006.01)

(52) U.S. Cl.
  CPC .......... *F16H 59/22* (2013.01); *F16H 59/54* (2013.01); *F16H 59/70* (2013.01); *F16H 61/0021* (2013.01); *F16H 61/02* (2013.01); *F16H 61/66272* (2013.01); *F16H 2037/023* (2013.01); *F16H 2200/0034* (2013.01); *F16H 2200/2007* (2013.01); *F16H 2200/2038* (2013.01)

(56) References Cited

U.S. PATENT DOCUMENTS

| | | | | |
|---|---|---|---|---|
| 5,776,028 A | * | 7/1998 | Matsuda | F16H 61/66272 477/45 |
| 5,853,347 A | * | 12/1998 | Aoki | F16H 61/66259 477/45 |
| 6,050,913 A | * | 4/2000 | Reuschenbach | B60W 10/06 474/69 |
| 8,296,023 B2 | * | 10/2012 | Kojima | F16H 61/143 701/59 |
| 8,911,326 B2 | * | 12/2014 | Waku | F16H 61/0031 477/158 |
| 9,618,114 B2 | * | 4/2017 | Suzumura | F16H 61/66272 |
| 9,915,343 B2 | * | 3/2018 | Takemori | F16H 61/66272 |
| 9,989,150 B2 | * | 6/2018 | Yamanaka | B60K 6/48 |

* cited by examiner

This invention relates to a control device and a control method for a continuously variable transmission mechanism for a vehicle provided with a stepwise variable transmission mechanism which has two or more gear stages, and which is provided in series with the continuously variable transmission mechanism.

CONTROL DEVICE AND CONTROL METHOD FOR CONTINUOUSLY VARIABLE TRANSMISSION MECHANISM FOR VEHICLE

TECHNICAL FIELD

This invention relates to a control device and a control method for a continuously variable transmission mechanism for a vehicle provided with a stepwise variable transmission mechanism which has two or more gear stages, and which is provided in series with the continuously variable transmission mechanism.

BACKGROUND ART

Conventionally, there is known a control device for a continuously variable transmission arranged to increase a belt capacity based on a release of an accelerator pedal (cf. for example, a patent document 1). When the brake pedal is depressed after the release of the accelerator pedal, the deficiency of the belt capacity with respect to the input torque from the driving wheel to the belt is prevented by the increase of the belt capacity, so as to prevent the belt slippage.

However, in a case where the conventional art is applied to a transmission provided with a stepwise variable transmission mechanism which has two or more gear stages, and which is disposed in series with the variator, an increase amount of the belt capacity is a fixed value, irrespective of the gear stage of the stepwise variable transmission mechanism. Accordingly, the belt capacity may be unnecessary increased, so that the fuel economy is deteriorated.

PRIOR ART DOCUMENT

Patent Document

Patent Document 1: Japanese Patent Application Publication No. 11-082707

SUMMARY OF THE INVENTION

It is, therefore, an object of the present invention to provide a control device of a continuously variable transmission mechanism for a vehicle which is devised to suppress a belt capacity to a lower value during a coast traveling relative to a case where a stepwise variable transmission mechanism is not a lowest transmission gear ratio, and thereby to improve a fuel consumption.

A control device for a continuously variable transmission mechanism of a vehicle according to the present invention comprises: a continuously variable transmission mechanism which is disposed between a travelling drive source and a driving wheel, and in which a belt capacity of a primary pulley and a belt capacity of a secondary pulley are controlled by supplied hydraulic pressures being controlled; a stepwise variable transmission mechanism which is disposed in series with the continuously variable transmission mechanism, and which has at least two or more forward gear stages; and a control means configured to increase the belt capacities to be greater than the belt capacity set when an accelerator opening degree is zero, at least in a time period from a timing when the accelerator opening degree becomes zero, to a timing when a braking force is generated by a depression of a brake pedal, the control means being configured to set an increase amount with respect to the belt capacity set when the accelerator opening degree is zero, to a smaller value as a transmission gear ratio of the stepwise variable transmission mechanism is higher.

Accordingly, in the present invention, the increasing amount with respect to the belt capacity which is set when the accelerator opening degree is zero is controlled to be smaller as the transmission gear ratio of the stepwise variable transmission mechanism disposed in series with the continuously variable transmission mechanism becomes the higher transmission gear ratio side.

That is, the increasing amount with respect to the belt capacity is set to be smaller as the transmission gear ratio of the stepwise variable transmission mechanism becomes the higher transmission gear ratio side. Accordingly, in a case where the transmission gear ratio of the stepwise variable transmission mechanism 30 is not the lowest transmission gear ratio, the belt capacity is not unnecessary increased.

Therefore, in a case where the stepwise variable transmission mechanism is not the lowest transmission gear ratio during the coast traveling, it is possible to improve the fuel economy by suppressing the belt capacity to the low value.

DESCRIPTION OF EMBODIMENTS

Hereinafter, an embodiment to attain a control device for a continuously variable transmission mechanism of a vehicle is explained with reference to the drawings.

Firstly, Configurations are Explained.

In the control device according to the embodiment, the present invention is applied to an engine vehicle including a transmission referred to as a continuously variable transmission with an auxiliary transmission. Hereinafter, configurations of a control device for a variator of an engine vehicle in the embodiment are explained about "Overall System Configuration", "Shift Control Configuration by Shift Map", and "Coast Pulley Pressure Control Process Configuration".

[Overall System Configuration]

Figure 1:
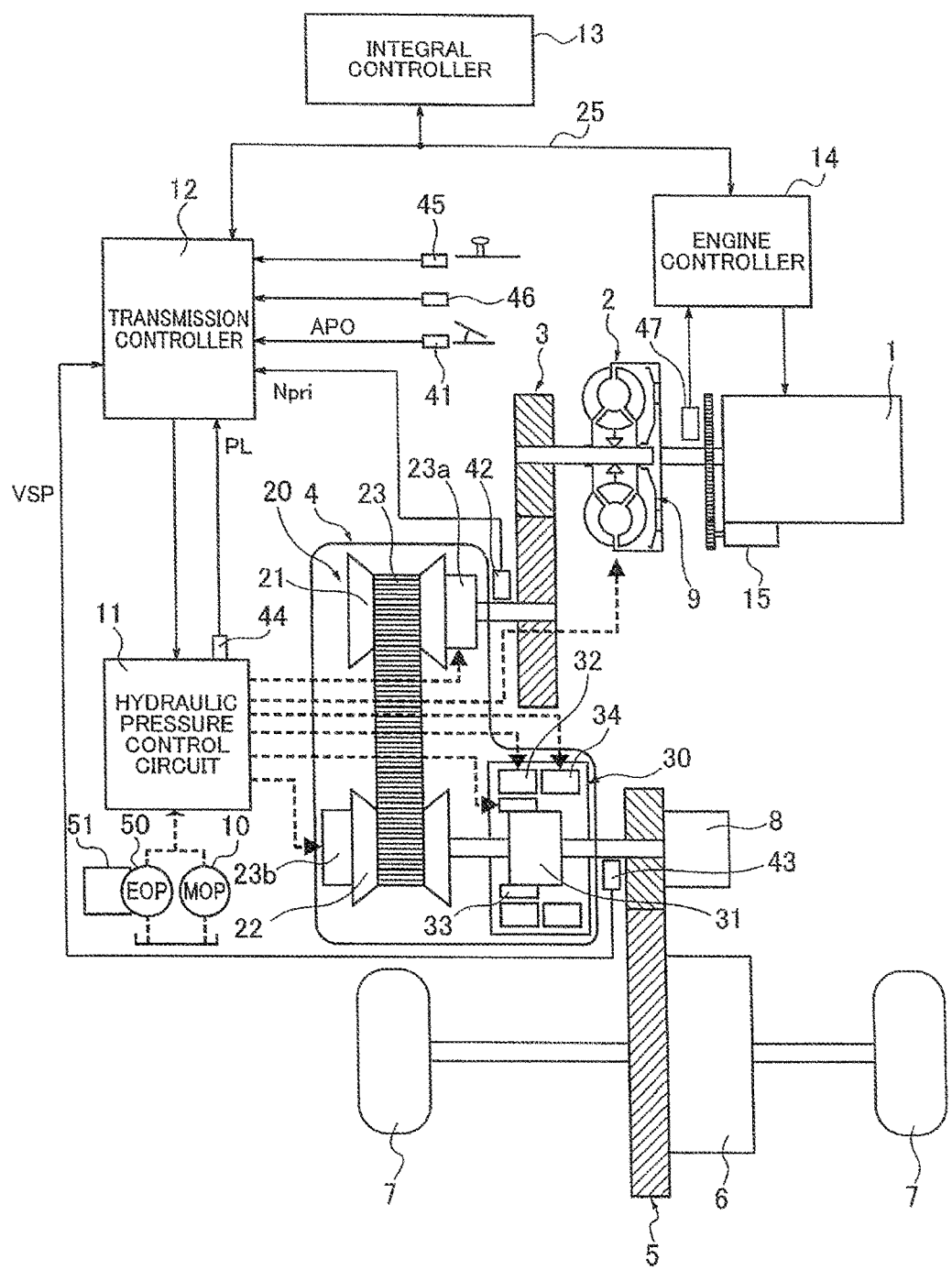
FIG. 1 is an overall configuration view showing an engine vehicle on which a continuously variable transmission which has an auxiliary transmission is mounted, and to which a control device according to an embodiment is applied.
Figure 2:
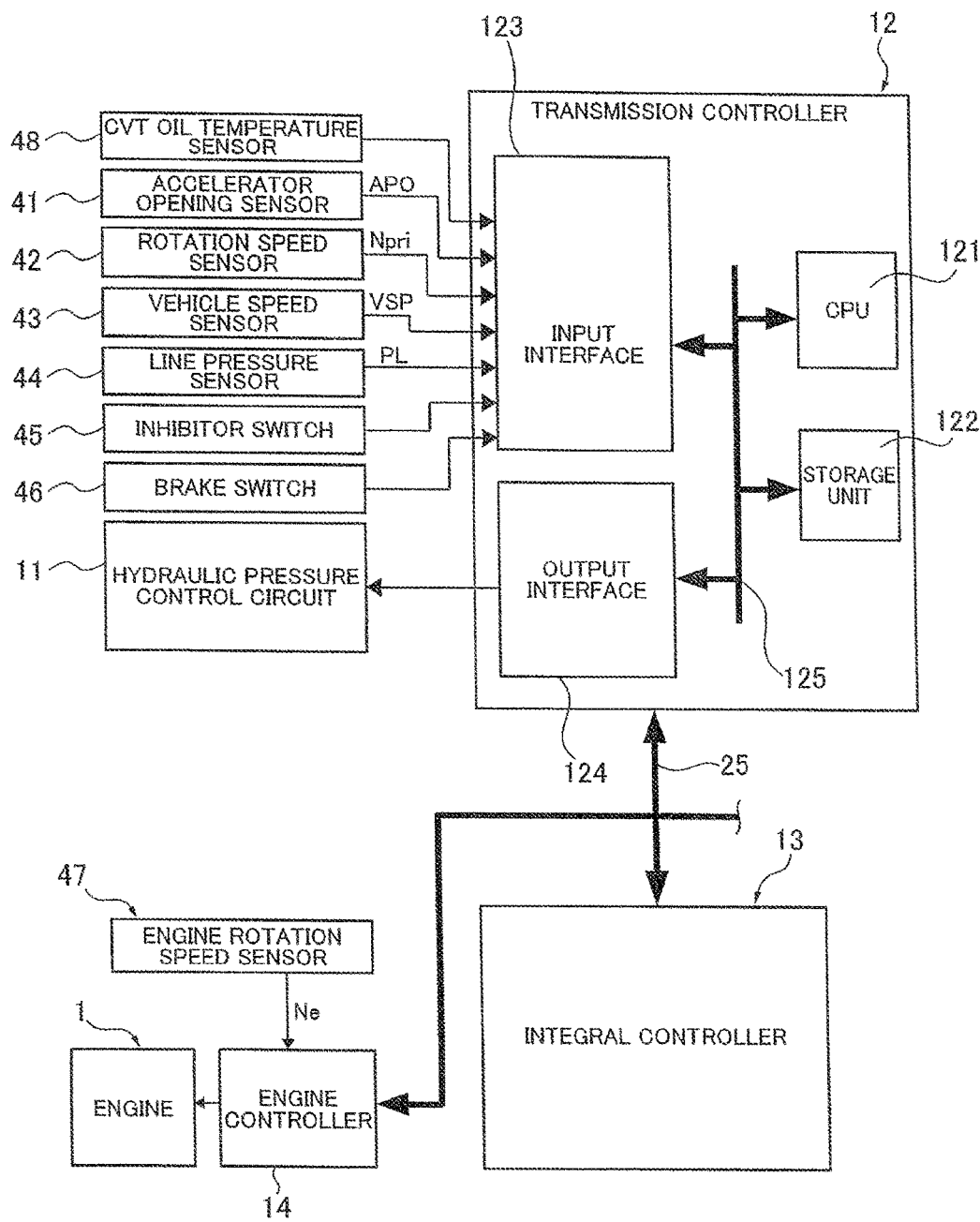
FIG. 2 is a block diagram showing an inside configuration of a transmission controller in the embodiment.

FIG. 1 is an overall configuration of the engine vehicle including the continuously variable transmission with the auxiliary transmission to which the control device according to the embodiment is applied. FIG. 2 is an inside configuration of the transmission controller. Hereinafter, the overall system configuration is explained with reference to FIG. 1 and FIG. 2.

Besides, in the following explanations, a "transmission gear ratio" of a transmission mechanism is a value obtained by dividing an input rotation speed of the transmission mechanism by an output rotation speed of the transmission mechanism. Moreover, a "lowest transmission gear ratio" means a maximum transmission gear ratio of the transmission mechanism. A "highest transmission gear ratio" means a minimum transmission gear ratio of the transmission mechanism.

The engine vehicle shown in FIG. 1 includes an engine 1 which is a traveling drive source, and which has a starter motor 15 for starting the engine. An output rotation of the engine 1 is transmitted to a driving wheel 7 through a torque converter 2 having a lockup clutch 9, a reduction gear train 3, a continuously variable transmission 4 (hereinafter, referred to as "automatic transmission 4") with an auxiliary transmission, a final gear train 5, a final speed reduction device 6. A parking mechanism 8 is provided to the final gear train 5. The parking mechanism 8 is arranged to mechanically lock an output shaft of the automatic transmission 4 at the parking so that the output shaft is not rotated. The engine vehicle includes, as hydraulic pressure sources, a mechanical oil pump 10 arranged to be driven by a power of the engine 1, and an electric oil pump 50 arranged to be driven by a power of the motor 51. Moreover, there are provided a hydraulic pressure control circuit 11 configured to regulate a discharge pressure from the mechanical oil pump 10 or the electric oil pump 50, and to supply the regulated pressure to respective parts of the automatic transmission 4; a transmission controller 12 configured to control the hydraulic pressure control circuit 11; an integral controller 13; and an engine controller 14. Hereinafter, respective configurations are explained.

The automatic transmission includes a belt type continuously variable transmission mechanism (hereinafter, referred to as "variator 20"); and the auxiliary transmission mechanism 30 provided in series with the variator 20. In this case, "provided in series with" means that the variator 20 and the auxiliary transmission mechanism 30 are provided in series with each other in a power transmitting path. The auxiliary transmission mechanism 30 may be directly connected to the output shaft of the variator 20 like in this example. Moreover, the auxiliary transmission mechanism 30 may be connected through other transmission mechanism or power transmitting mechanism (for example, gear row train) to the output shaft of the variator 20.

The variator 20 is a belt type continuously transmission mechanism including a primary pulley 21; a secondary pulley 22; and a V belt 23 wound around the pulleys 21 and 22. Each of the pulleys 21 and 22 includes a fixed conical plate; a movable conical plate disposed so that a sheave surface confronts the fixed conical plate to form a V groove between the fixed conical plate and the movable conical plate; and a primary hydraulic cylinder 23a and a secondary hydraulic pressure 23b which are provided, respectively, on back surfaces of the movable conical plates, and which are arranged to move the movable conical plates in axial directions. By regulating the hydraulic pressures supplied to the primary hydraulic cylinder 23a and the secondary hydraulic cylinder 23b, the widths of the V grooves are varied so that contact radii between the V belt 23 and the pulleys 21 and 22 are varied. With this, the transmission gear ratio of the variator 20 is continuously varied.

The auxiliary transmission mechanism 30 is a transmission mechanism having two forward gear stages and a reverse gear stage. The auxiliary transmission mechanism 30 includes a Ravigneaux planetary gear mechanism 31 in which carriers of two planetary gears are connected; and a plurality of frictional engagement elements (a low brake 32, a high clutch 33, and a reverse brake 34).

The gear stage of the auxiliary transmission mechanism 30 is varied by varying engagement/disengagement states of the frictional engagement elements 32 to 34 by regulating the hydraulic pressures supplied to the frictional engagement elements 32 to 34. For example, the gear stage of the auxiliary transmission mechanism 30 is brought to a first forward speed (hereinafter, referred to as "low speed mode") by the engagement of the low brake 32 and disengagements of the high clutch 33 and the reverse brake 34. The gear stage of the auxiliary transmission mechanism 30 is brought to a second forward speed (hereinafter, referred to as "high speed mode") having the transmission gear ratio smaller than the transmission gear ratio of the first speed by the engagement of the high clutch 33 and the disengagements of the low brake 32 and the reverse brake 34. Moreover, the gear stage of the auxiliary transmission mechanism 30 is brought to the reverse speed by the engagement of the reverse brake 34 and the disengagements of the low brake 32 and the high clutch 33. Besides, all of the low brake 32, the high clutch 33, and the reverse brake 34 of the auxiliary transmission mechanism 30 are disengaged, so that the driving force transmitting path to the driving wheel 7 is disconnected. Hereinafter, the low brake 32 and the high clutch 33 are referred to as a "forward clutch Fwd/C".

As shown in FIG. 2, the transmission controller 12 includes a CPU 121; a storage device 122 constituted by RAM•ROM; an input interface 123; an output interface 124; and a bus 125 connecting these components. This transmission controller 12 is configured to control the transmission gear ratio of the variator 20, and to perform changeover of the plurality of the frictional engagement elements (the low brake 32, the high clutch 33, and the reverse brake 34) of the auxiliary transmission mechanism 30 to attain a predetermined gear stage.

The input interface 123 receives an output signal of an accelerator opening degree sensor 41 arranged to sense a depression opening degree of an accelerator pedal (hereinafter, referred to as "accelerator opening degree APO"), an output signal of a rotation speed sensor 42 arranged to sense an input rotation speed of the automatic transmission 4 (=the primary pulley rotation speed, hereinafter, referred to as "primary rotation speed Npri"), an output signal of a vehicle speed sensor 43 arranged to sense a traveling speed of the vehicle (hereinafter, referred to as "vehicle speed VSP"), an output signal of a line pressure sensor 44 arranged to sense a line pressure of the automatic transmission 4 (hereinafter, referred to as "line pressure PL"), an output signal of an inhibitor switch 45 arranged to sense a position of a select lever, an output signal of a brake switch 46 arranged to sense a brake state, and so on. Moreover, the input interface 123 receives an output signal of a CVT oil temperature sensor 48 arranged to sense a temperature of a transmission hydraulic fluid.

The storage device 122 stores a shift control program of the automatic transmission 4, and a shift map (FIG. 3) used in this shift control program. The CPU 121 reads the shift control program stored in the storage device 122, and executes the shift control program. The CPU 121 performs various calculation processes to various signals inputted through the input interface 123 to produce the shift control signals. The CPU 121 outputs the produced shift control signals through the output interface 124 to the hydraulic pressure control circuit 11. The various values used in the calculation process by the CPU 121, and the calculation results are stored in the storage device 122.

The hydraulic pressure control circuit 11 is constituted by a plurality of flow passages, and a plurality of hydraulic control valves. The hydraulic pressure control circuit 11 is configured to control the plurality of the hydraulic pressure control valves based on the shift control signals from the transmission controller 12, and thereby to switch a supply passage of the hydraulic pressure.

The integral controller 13 is configured to integrally monitor the plurality of the controllers mounted on the vehicle so as to appropriately ensure the transmission control by the transmission controller 12, and the engine controller by the engine controller 14. This integral controller 13 is connected through the CAN communication line 25 to the vehicle mounted controller such as the transmission controller 12 and the engine controller 14 so as to exchange the information.

The engine controller 14 performs a fuel cut control of the engine 1 at the accelerator release operation, an engine start control to start the engine 1 by using the starter motor 15, and so on. This engine controller 14 receives an output signal of an engine speed sensor 47 arranged to sense a rotation speed of the engine 1 (hereinafter, referred to as "engine speed Ne"), and so on.

[Shift Control Configuration Based on Shift Map]

Figure 3:
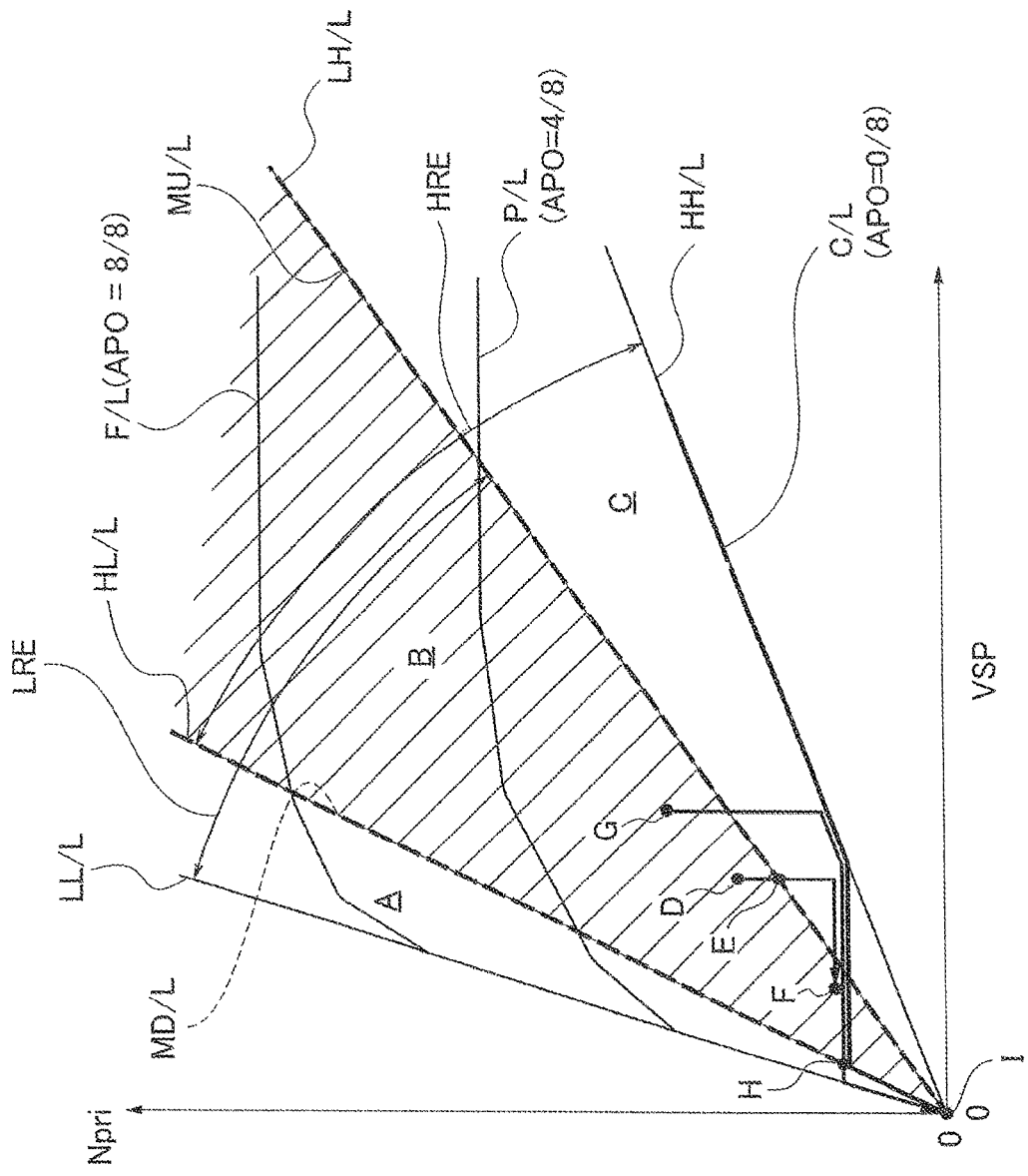
FIG. 3 is a shift map diagram showing one example of a shift map stored in a storage device of the transmission controller in the embodiment.

FIG. 3 shows one example of the shift map stored in the storage device of the transmission controller. Hereinafter, the shift control configuration based on the shift map is explained.

An operating point of the automatic transmission 4 is determined by the vehicle speed VSP and the primary rotation speed Npri on the shift map shown in FIG. 3. A gradient of the line connecting the operating point of the automatic transmission 4 and zero at lower left corner of the shift map represents the transmission gear ratio of the automatic transmission 4 (an overall transmission gear ratio obtained by multiplying the transmission gear ratio vRatio of the variator 20 by the transmission gear ratio subRatio of the auxiliary transmission mechanism 30, hereinafter, referred to as "through transmission gear ratio Ratio").

In this shift map, a shift line is set at each accelerator opening degree APO, like the shift map of the conventional belt continuously variable transmission. The shift of the automatic transmission 4 is performed along the shift line selected in accordance with the accelerator opening degree APO. For the sake of simplicity, FIG. 3 shows only a full load line F/L (a shift line at the accelerator opening degree APO=8/8), a partial line P/L (a shift line at the accelerator opening degree APO=4/8), and a coast line C/L (a shift line at the accelerator opening degree=0).

When the automatic transmission 4 is in the low speed mode, the automatic transmission 4 can be shifted between a low speed mode lowest line LL/L obtained when the transmission gear ratio vRatio of the variator 20 is maximized, and a low speed mode highest line LH/L when the transmission gear ratio vRatio of the variator 20 is minimized. In this case, the operating point of the automatic transmission 4 is moved in an A region and a B region. On the other hand, when the automatic transmission 4 is in the high mode, the automatic transmission 4 can be shifted between a high speed mode lowest line HL/L obtained when the transmission gear ratio vRatio of the variator 20 is maximized, and a high speed highest line HH/L obtained when the transmission gear ratio vRatio of the variator 20 is minimized. In this case, the operating point of the automatic transmission 4 is moved in the B region and in a C region.

The transmission gear ratios of the gear stages of the auxiliary transmission mechanism 30 are set so that the transmission gear ratio (the low speed mode highest transmission gear ratio) corresponding to the low speed mode highest line LH/L is smaller than the transmission gear ratio (the high speed mode lowest transmission gear ratio) corresponding to the high speed mode lowest line HL/L. With this, a low speed mode ratio region LRE of the through transmission gear ratio Ratio which can be attained by the automatic transmission 4 in the low speed mode is partially overlapped with a high speed mode ratio region HRE of the through transmission gear ratio Ratio which can be attained by the automatic transmission 4 in the high speed mode. When the operating point of the automatic transmission 4 is in the B region (overlap region) which is sandwiched by the high speed mode lowest line HL/L and the low speed mode highest line LH/L, the automatic transmission 4 can select either the low speed mode or the high speed mode.

The transmission controller 12 is configured to set the through transmission gear ratio Ratio corresponding to the vehicle speed VSP and the accelerator opening degree APO (the driving state of the vehicle) to a desired through transmission gear ratio DRatio, with reference to this shift map. This desired through transmission gear ratio DRatio is a target value which the through transmission gear ratio Ratio finally reaches in this driving state. Moreover, the transmission controller 12 sets a target through transmission gear ratio tRatio which is a transient target value by which the through transmission gear ratio Ratio is followed to the desired transmission gear ratio DRatio by a desired response characteristic. The transmission controller 12 controls the variator 20 and the auxiliary transmission mechanism 30 so that the through transmission gear ratio Ratio corresponds to the target through transmission gear ratio tRatio.

In the shift map, a mode switching upshift line MU/L (1→2 upshift line of the auxiliary transmission mechanism 30) to perform the upshift of the auxiliary transmission mechanism 30 is set to be substantially overlapped with the low speed mode highest line LH/L. The through transmission gear ratio Ratio corresponding to the mode switching upshift line MU/L is substantially identical to the low speed mode highest line LH/L (the low speed mode highest transmission gear ratio). Moreover, in the shift map, a mode switching downshift line MD/L (2→1 downshift line of the auxiliary transmission mechanism 30) to perform the downshift of the auxiliary transmission mechanism 30 is set to be substantially overlapped with the high speed mode lowest line HL/L. The through transmission gear ratio Ratio corresponding to the mode switching downshift line MD/L is substantially identical to the high speed mode lowest transmission gear ratio (the high speed mode lowest line HL/L).

Then, when the operating point of the automatic transmission 4 is moved across the mode switching upshift line MU/L or the mode switching downshift line MD/L, that is, when the target through transmission gear ratio tRatio of the auxiliary transmission mechanism is varied to be moved across the mode switching transmission gear ratio mRatio, or to correspond to the mode switching transmission gear ratio mRatio, the transmission controller 12 is configured to perform the mode switching shift control. In this mode switching shift control, the transmission controller 12 is configured to perform a "cooperative control" to shift the auxiliary transmission mechanism 30, and to vary the transmission gear ratio vRatio of the variator 20 in a direction opposite to the direction of the variation of the transmission gear ratio subRatio of the auxiliary transmission mechanism 30.

In the "cooperative control", when the target through transmission gear ratio tRatio of the automatic transmission 4 is moved across the switching upshift line MU/L from the B region side to the C region side, or when the target through transmission gear ratio tRatio of the automatic transmission 4 corresponds to the mode switching upshift line MU/L from the B region side, the transmission controller 12 is configured to output the 1→2 upshift judgment, and to vary the gear stage the auxiliary transmission mechanism 30 from the first speed to the second speed. Moreover, the transmission controller 12 is configured to vary the transmission gear ratio vRatio of the variator 20 from the highest transmission gear ratio toward the low transmission gear ratio. Conversely, when the target through transmission gear ratio tRatio of the automatic transmission 4 is moved across the mode switching downshift line MD/L from the B region side to the A region side, or when the target through transmission gear ratio tRatio corresponds to the mode switching downshift line MD/L from the B region side, the transmission controller 12 is configured to output 2→1 downshift judgment, and to vary the gear stage of the auxiliary transmission mechanism 30 from the second speed to the first speed. Moreover, the transmission controller 12 is configured to vary the transmission gear ratio vRatio of the variator 20 from the lowest transmission gear ratio toward the highest transmission gear ratio.

In the mode switching upshift or the mode switching downshift, the "cooperative control" to vary the transmission gear ratio vRatio of the variator 20 is performed. With this, it is possible to suppress the unnatural feeling of the driver due to the variation of the input rotation speed which is generated by the stepwise change of the through transmission gear ratio Ratio of the automatic transmission 4, and to ease the shift shock of the auxiliary transmission mechanism 30.

[Coast Pulley Pressure Control Process Configuration]

Figure 4:
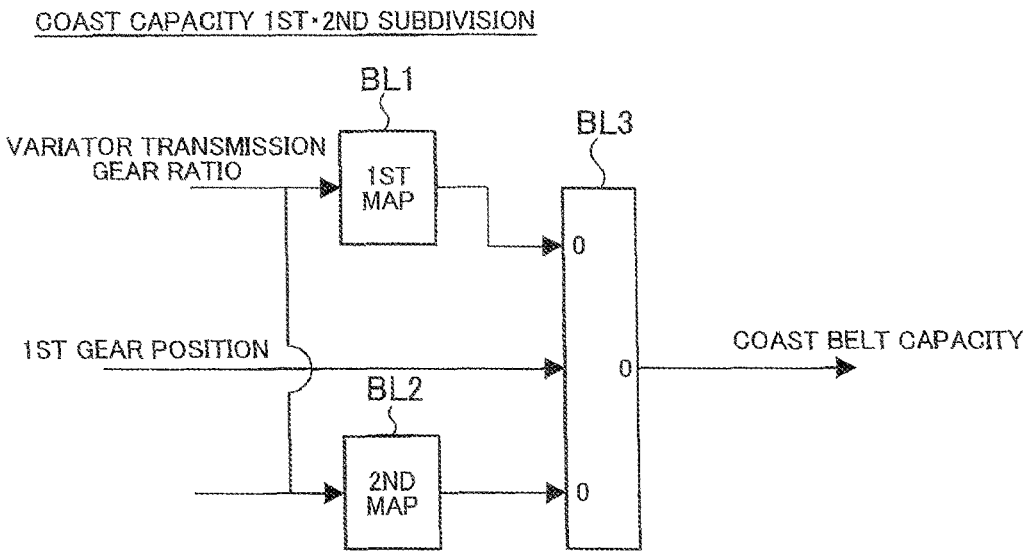
FIG. 4 is a block diagram showing a coast capacity subdivision in a coast pulley pressure control performed in the transmission controller in the embodiment.
Figure 5:
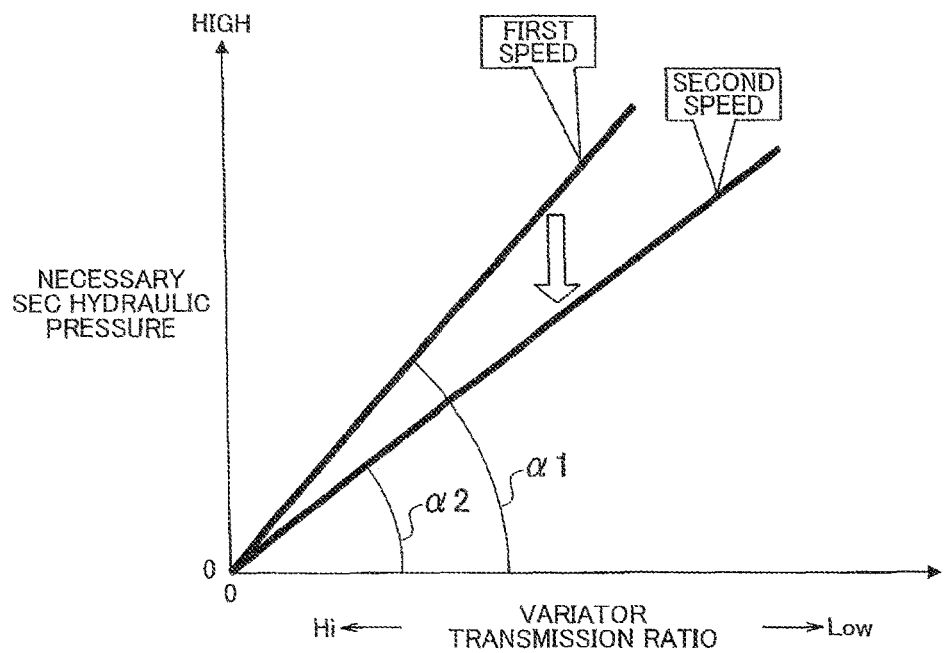
FIG. 5 is a map showing a first speed map and a second speed map which are based on a relationship between a variator transmission gear ratio and a necessary SEC hydraulic pressure, and which are used in the coast pulley pressure control.

FIG. 4 is a coast capacity subdivision in a coast pulley pressure control performed in the transmission controller 12 in the embodiment. FIG. 5 shows a first speed map and a second speed map. Hereinafter, the coast capacity subdivision in the coast pulley pressure control is explained with reference to FIG. 4 and FIG. 5.

In the coast pulley pressure control, the coast capacity 1st and 2nd are subdivided to divide a case in which the coast belt capacity is determined when the auxiliary transmission mechanism 30 is in the first speed (1st), and a case in which the coast belt capacity is determined when the auxiliary transmission mechanism 30 is in the second speed (2nd).

That is, there are a block BL1, a block BL2, and a block BL3, as shown in a block diagram of FIG. 4. In the block BL1, the variator transmission gear ratio is inputted. A first speed necessary SEC hydraulic pressure corresponding to the variator transmission gear ratio is determined based on the first speed map shown in FIG. 5. In the block BL2, the variable transmission gear ratio is inputted. A second speed necessary SEC hydraulic pressure according to the variable transmission gear ratio is determined based on the second speed map shown in FIG. 5. The "SEC hydraulic pressure" is a secondary pulley pressure of the variator 20 described later.

The block BL3 receives the first speed necessary SEC hydraulic pressure, the second speed necessary SEC hydraulic pressure, and the first speed gear position information. The block BL3 selects one of the first speed necessary SEC hydraulic pressure and the second speed necessary SEC hydraulic pressure. The block BL3 outputs a command to obtain the necessary SEC hydraulic pressure to attain (obtain) the coast belt capacity.

Figure 6:
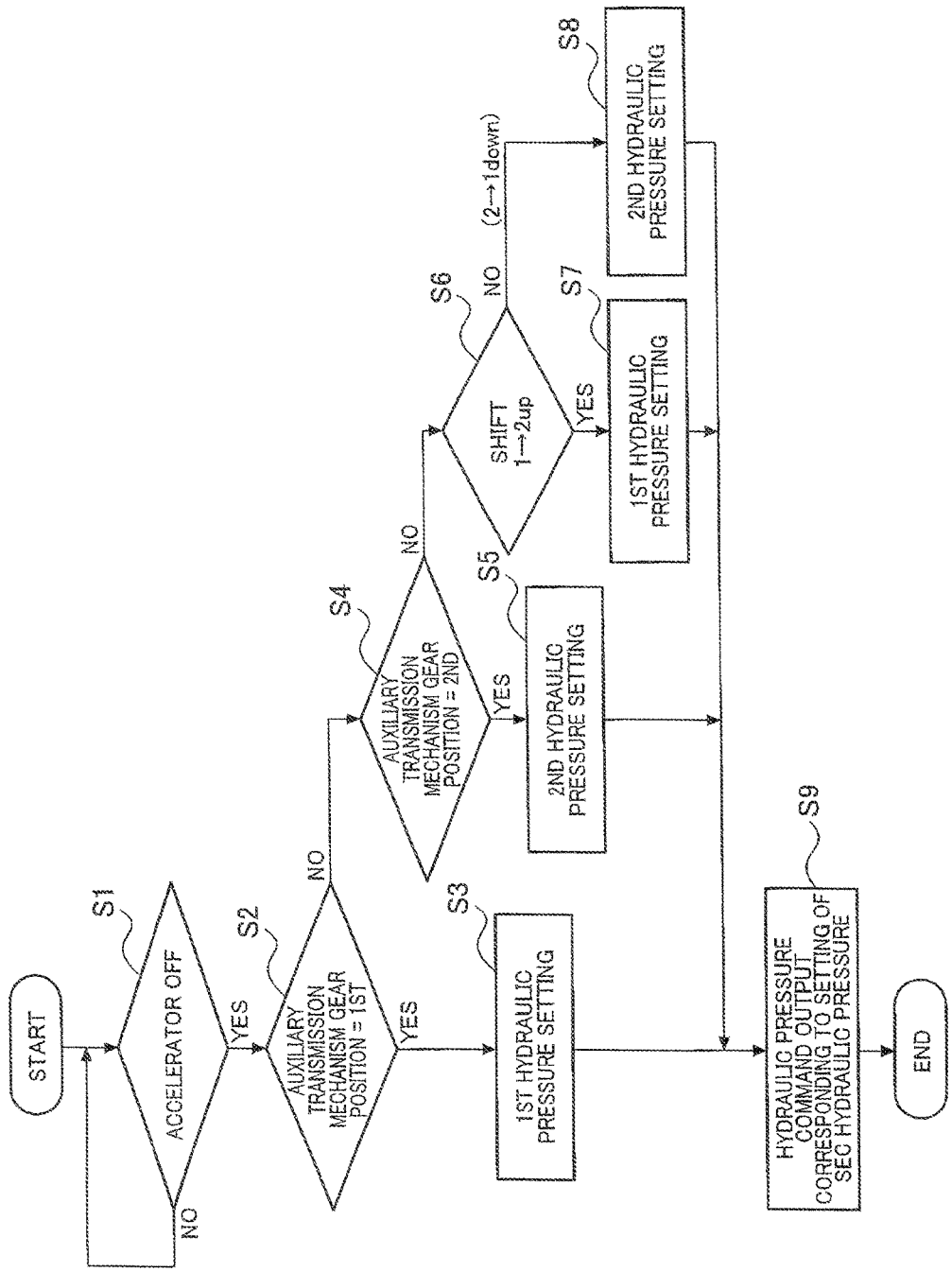
FIG. 6 is a flowchart showing a flow of the coast pulley pressure control process performed in the transmission controller in the embodiment.

In this case, the first speed map shown in FIG. 5 has a characteristic in which the first speed necessary SEC hydraulic pressure is gradually increased with a gradient α for suppressing the belt slippage as the variator transmission gear ratio is shifted to a lower transmission gear ratio side. The second speed map shown in FIG. 5 has a characteristic in which the second speed necessary SEC hydraulic pressure is gradually increased with a gradient α2 (<α1) for suppressing the belt slippage as the variator transmission gear ratio is shifted to the lower transmission gear ratio side. That is, the second speed necessary SEC hydraulic pressure (the belt capacity) becomes lower than the first speed necessary SEC hydraulic pressure (the belt capacity), at the same variator transmission gear ratio FIG. 6 shows a flow of a coast pulley pressure control process configuration performed in the transmission controller 12 in this embodiment (control means). Hereinafter, steps of FIG. 6 which represents the coast pulley pressure control process configuration are explained.

At step S1, it is judged whether or not the accelerator pedal release operation is performed when the vehicle is traveled by engaging the forward clutch Fwd/C (the low brake 32 or the high clutch 33) by using the engine 1 as the traveling drive source. In case of YES (the accelerator OFF), the process proceeds to step S2. In case of NO (the accelerator ON), the process repeats the judgment of step S1.

In this case, it is judged whether or not the accelerator release operation is performed by the accelerator opening signal from the accelerator opening degree sensor 41. In case of the accelerator opening degree=0, it is judged that the vehicle is in the coast traveling by the accelerator release operation.

Subsequently to the judgment of the accelerator OFF at step S1, it is judged whether or not the gear position of the auxiliary transmission mechanism 30 is the first speed (1st) at step S1. In case of YES (the gear position of the auxiliary transmission mechanism=1st), the process proceeds to step S3. In case of NO (the gear position of the auxiliary transmission mechanism is other than 1st), the process proceeds to step S4.

In this case, it is judged that the gear position of the auxiliary transmission mechanism 30 is the first speed (1st) when the first speed command value is outputted in a case where there is not the shift request such as the upshift and the downshift, as the shift command value to the auxiliary transmission mechanism 30. Alternatively, it may be judged that the gear position of the auxiliary transmission mechanism 30 is the first speed (1st) by calculating the transmission gear ratio from the input rotation speed and the output rotation speed of the auxiliary transmission mechanism 30.

Subsequently to the judgment of the auxiliary transmission mechanism gear position=1st at step S2, the first speed necessary SEC hydraulic pressure according to the variator transmission gear ratio at that time is set based on the 1st speed map shown in FIG. 5 at step S3. The process proceeds to step S9.

Subsequently to the judgment in which the gear position of the auxiliary transmission mechanism is other than the first speed at step S2, it is judged whether or not the gear position of the auxiliary transmission mechanism is the second speed (2nd) at step S4. In case of YES (the gear position of the auxiliary transmission mechanism=2nd), the process proceeds to step S5. In case of NO (the gear position of the auxiliary transmission mechanism is other than 2nd), the process proceeds to step S6.

In this case, it is judged that the gear position of the auxiliary transmission mechanism 30 is the second speed (2nd) when the second speed command value is outputted in a case where there is not the shift request such as the upshift and the downshift, as the shift command value to the auxiliary transmission mechanism 30. Alternatively, it may be judged that the gear position of the auxiliary transmission mechanism 30 is the second speed (2nd) by calculating the transmission gear ratio from the input rotation speed and the output rotation speed of the auxiliary transmission mechanism 30.

Subsequently to the judgment of the gear position of the auxiliary transmission mechanism=2nd at step S4, the second speed necessary SEC hydraulic pressure corresponding to the variator transmission gear ratio at that time is set based on the second speed map shown in FIG. 5 at step S5. The process proceeds to step S9.

Subsequently to the judgment in which the gear position of the auxiliary transmission mechanism is other than 2nd at step S4, it is judged whether or not the auxiliary transmission mechanism 30 is during the upshift from the first speed to the second speed at step S6. In case of YES (1→2 upshift), the process proceeds to step S7. In case of NO (2→1 downshift), the process proceeds to step S8.

In this case, the judgment of the shift is performed based on the shift command value by which the auxiliary transmission mechanism 30 is requested to be upshifted and downshifted.

Subsequently to the judgment of 1→2 upshift at step S6, the first speed necessary SEC hydraulic pressure corresponding to the variation of the variator transmission gear ratio is set based on the first speed map shown in FIG. 5 at step S7. The process proceeds to step S9.

In this case, the variator 20 is downshifted during the 1→2 upshift of the auxiliary transmission mechanism 30 so as not to vary the through transmission gear ratio.

Subsequently to the judgment of the 2→1 downshift at step S6, the second speed necessary SEC hydraulic pressure corresponding to the variation of the variator transmission gear ratio is set based on the second speed map shown in FIG. 5 at step S8. The process proceeds to step S9.

In this case, the variator 20 is upshifted during the 2→1 downshift of the auxiliary transmission mechanism 30 so as not to vary the through transmission gear ratio.

Subsequently to the setting of the necessary SEC hydraulic pressure at one of steps S3, S5, S7, S8, the hydraulic pressure command corresponding to the setting of the necessary SEC hydraulic pressure is outputted to the hydraulic pressure control circuit 11. The process proceeds to the end.

In this case, when the necessary SEC hydraulic pressure to the secondary pulley 22 is set, the necessary PRI hydraulic pressure to the primary pulley 21 is set so as to obtain a balance thrust ratio according to a target variator transmission gear ratio of the variator 20.

Next, Operations are Explained.

The operations in the control device of the variator for the engine vehicle in the embodiment are explained about "coast pulley pressure control process operation", "coast pulley pressure control operation", and "coast pulley pressure control characteristic operation".

[Coast Pulley Pressure Control Process Operation]

The coast pulley pressure control process operation in the embodiment is explained with reference to the flowchart shown in FIG. 6.

Firstly, when the accelerator release operation is performed in a case where the vehicle travels at the first speed by engaging the low brake 32, the process proceeds along step S1→step S2→step S3→step S9→the end in the flowchart of FIG. 6. At step S3, the first speed necessary SEC hydraulic pressure corresponding to the variator transmission gear ratio at that time is set based on the first speed map shown in FIG. 5. At step S9, the hydraulic pressure command corresponding to the setting of the necessary SEC hydraulic pressure is outputted to the hydraulic pressure control circuit 11.

When the accelerator release operation is performed in a case where the vehicle travels at the second speed by engaging the high clutch 33, the process proceeds along step S1→step S2→step S4→step S5→step S9→the end in the flowchart of FIG. 6. At step S5, the second speed necessary SEC hydraulic pressure corresponding to the variator transmission gear ratio at that time is set based on the second speed map shown in FIG. 5. At step S9, the hydraulic pressure command corresponding to the setting of the necessary SEC hydraulic pressure is outputted to the hydraulic pressure control circuit 11.

When the accelerator release operation is performed in a case where the vehicle travels during the upshift by the changeover from the engagement of the low brake 32 to the engagement of the high clutch 33, the process proceeds along step S1→step S2→step S4→step S6→step S7→step S9→the end in the flowchart of FIG. 6. At step S7, the first speed necessary SEC hydraulic pressure corresponding to the variator transmission gear ratio is set based on the first speed map shown in FIG. 5. At step S9, the hydraulic pressure command corresponding to the setting of the necessary SEC hydraulic pressure is outputted to the hydraulic pressure control circuit 11.

When the accelerator release operation is performed in a case where the vehicle travels during the downshift by the changeover from the engagement of the high clutch 33 to the engagement of the low brake 32, the process proceeds along step S1→step S2→step S4→step S6→step S8→step S9→the end in the flowchart of FIG. 6. At step S8, the second speed necessary SEC hydraulic pressure corresponding to the variator transmission gear ratio is set based on the second speed map shown in FIG. 5. At step S9, the hydraulic pressure command corresponding to the setting of the necessary SEC hydraulic pressure is outputted to the hydraulic pressure control circuit 11.

In this way, in the embodiment, the settings of the necessary SEC hydraulic pressure are different when the gear position of the auxiliary transmission mechanism 30 is in the first speed, and in the second speed, and when the auxiliary transmission mechanism 30 is during the 1→2 upshift, and during the 2→1 downshift during the coast traveling by the accelerator release operation.

That is, at the same variator transmission ratio, the necessary SEC hydraulic pressure when the gear position of the auxiliary transmission mechanism 30 is the second speed is set to be lower than the necessary SEC hydraulic pressure when the gear position of the auxiliary transmission mechanism 30 is the first speed. Moreover, during the 1→2 upshift of the auxiliary transmission mechanism 30, the necessary SEC hydraulic pressure at the first speed is set in accordance with the variator transmission ratio. During the 2→1 downshift of the auxiliary transmission mechanism 30, the necessary SEC hydraulic pressure at the second speed is set in accordance with the variator transmission gear ratio.

[Coast Pulley Pressure Control Operation]

In a case the belt capacity is deficient with respect to the input torque from the driving wheel to the belt when the brake pedal is depressed after the release of the accelerator pedal, the belt slippage in the variator is generated. For preventing this generation of the belt slippage, it is necessary to increase the belt capacity based on the release operation of the accelerator pedal.

In a case where the increase amount of the belt capacity is the fixed value when the belt capacity is increased based on the accelerator release operation for preventing the generation of the belt slippage, the fixed value is set to correspond to the highest increase amount. Accordingly, it is necessary to set to the belt capacity needed when the transmission gear ratio of the stepwise variable transmission mechanism is the lowest transmission gear ratio. Consequently, when the transmission gear ratio of the stepwise variable transmission mechanism is not the lowest transmission gear ratio, the belt capacity is unnecessarily increased. With this, the friction is increased to deteriorate the fuel economy.

On the other hand, in this embodiment, in the coast traveling by the accelerator release operation, the increase amount of the belt capacity when the transmission gear ratio of the auxiliary transmission mechanism 30 is the second speed is set to be smaller than the increase amount of the belt capacity when the transmission gear ratio of the auxiliary transmission mechanism 30 is the first speed. Besides, the "belt capacity" in the coast traveling is determined by the secondary pulley pressure (SEC pressure). The "increase amount of the belt capacity" is determined by the increase amount of the secondary pulley pressure.

That is, in a case where the transmission gear ratio of the auxiliary transmission mechanism 30 is the second speed in the coast traveling by the accelerator release operation, the rotation difference necessary for decreasing the primary pulley rotation speed Npri becomes smaller than the first speed of the auxiliary transmission mechanism 30 when the engine 1 side is viewed from the driving wheel 7 side. Accordingly, when the same torque is inputted from the driving wheel 7 side (in a case where the same braking operation is performed), the belt capacity necessary for preventing the slippage of the belt 23 of the variator 20 at the second speed of the auxiliary transmission mechanism 30 is smaller than that at the first speed of the auxiliary transmission mechanism 30. We focus on these matters.

Figure 7:
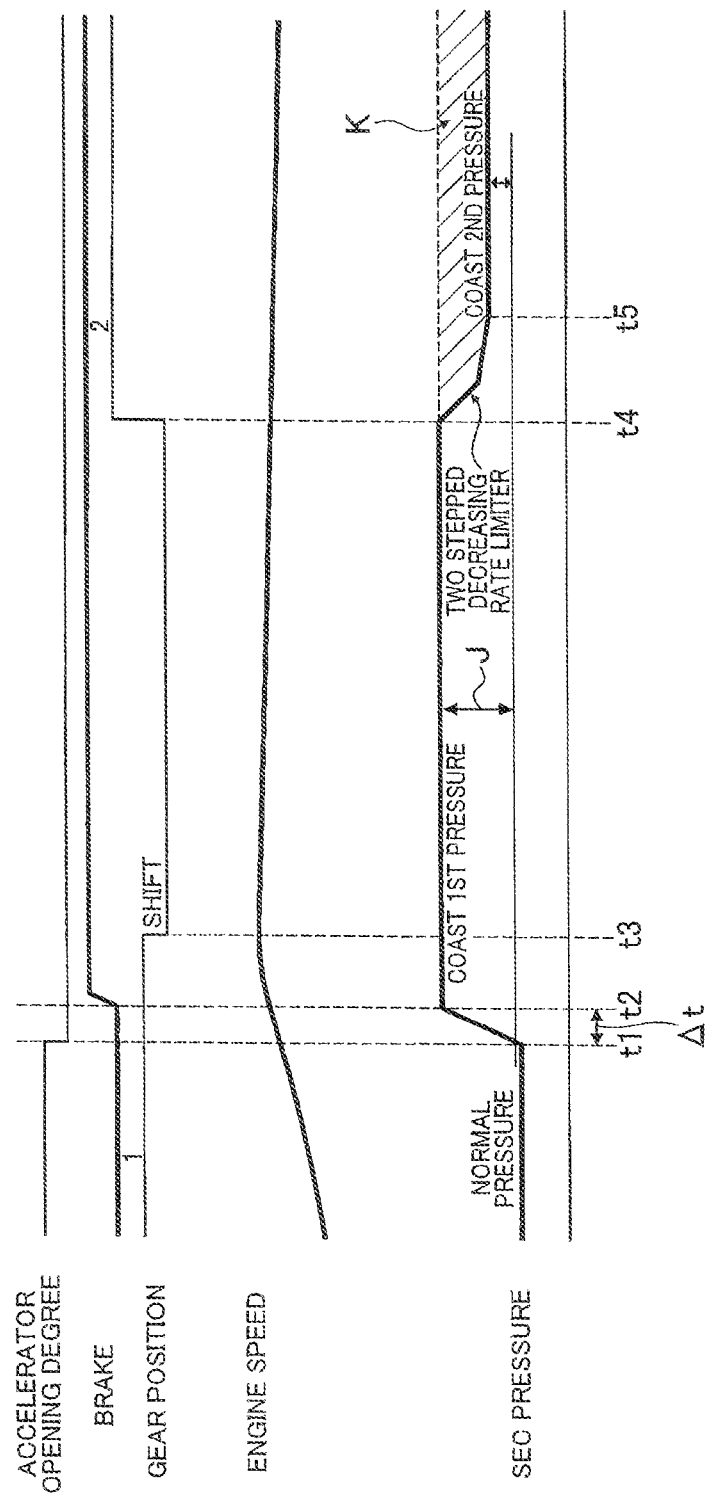
FIG. 7 is a time chart showing characteristics of an accelerator opening degree, a brake, a gear position, an engine speed, and a SEC pressure, in the coast pulley pressure control at an accelerator foot release upshift deceleration.
Figure 8:
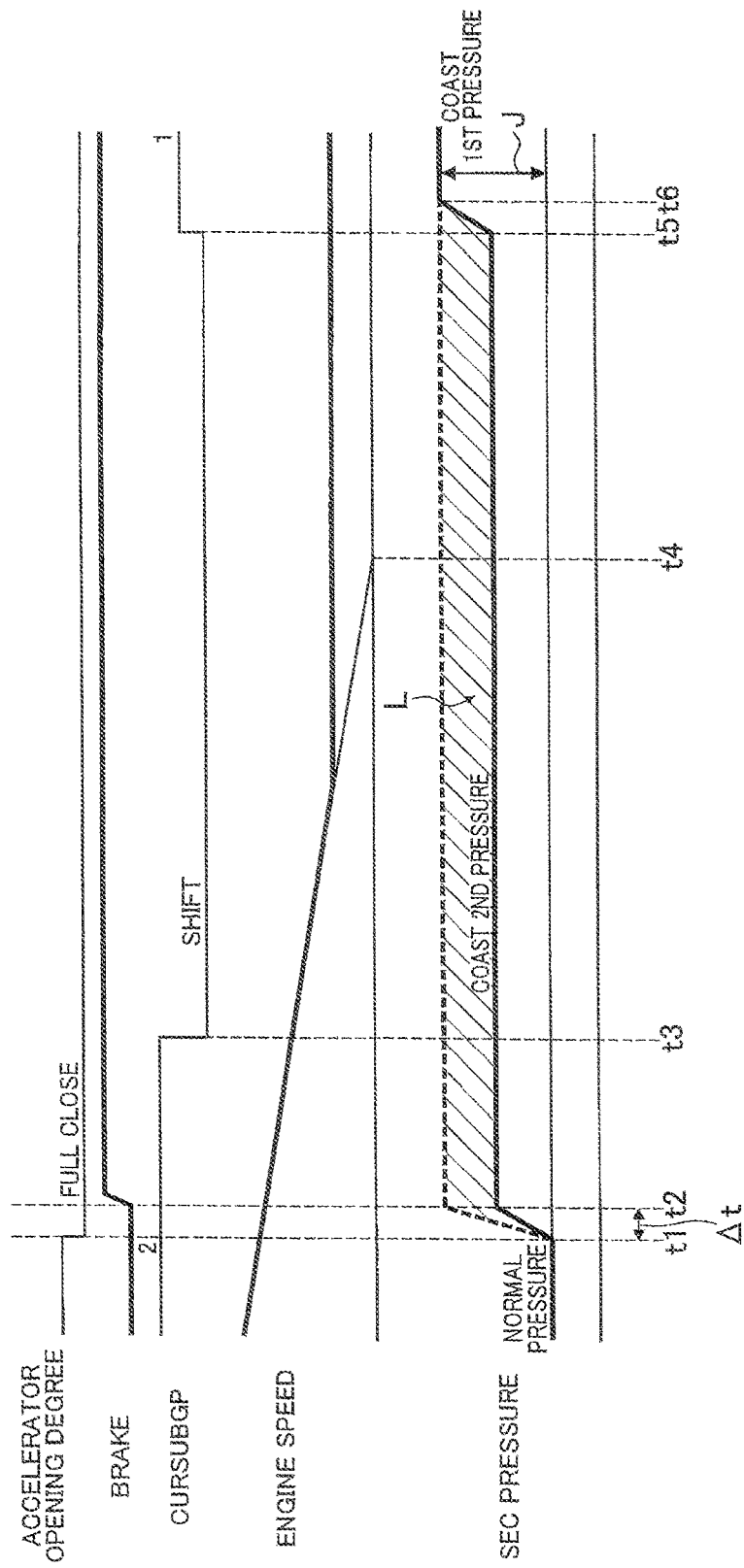
FIG. 8 is a time chart showing characteristics of an accelerator opening degree, a brake, a gear position, an engine speed, and a SEC pressure, in the coast pulley pressure control at an accelerator foot release downshift vehicle stop.

Therefore, when the auxiliary transmission mechanism 30 is the second speed which is not the lowest transmission gear ratio at the coast traveling, it is possible to improve the fuel economy by suppressing the belt capacity to the low value. Hereinafter, the fuel economy improvement operation by the coast pulley pressure control in the embodiment is explained about an accelerator foot release upshift deceleration (FIG. 7), and an accelerator foot release downshift vehicle stop (FIG. 8).

(Accelerator Foot Release Upshift Deceleration: FIG. 7)

In a case where the accelerator foot release operation and the brake depression operation are performed at the traveling when the gear position of the auxiliary transmission mechanism 30 is the first speed, the driving point (APO, VSP) is moved along D point→E point→F point, as shown in FIG. 3. The D point is a driving point in the first speed gear region. The E point is a position across the low speed mode highest line LH/L on which the 1→2 upshift request is outputted. The F point is a position at which the vehicle speed VSP is decreased along the coast line C/L.

In this way, as shown in FIG. 7, the accelerator foot release operation is performed at time t1 at the traveling when the gear position of the auxiliary transmission mechanism 30 is the first speed. At time t2, the brake depression operation is performed. With these, the SEC pressure is increased from the normal pressure to the coast 1st pressure. That is, in a case where a required time period Δt from time t1 to time t2 is a minimum time period for the accelerator/brake depression switching, the pressure command of the SEC pressure is increased by a predetermined gradient in consideration of this minimum time period Δt. That is, the SEC pressure is started to be increased from time t1 by the predetermined gradient by which the SEC pressure becomes the coast 1st pressure at time t2.

Then, at time t3, the 1→2 upshift is started based on the 1→2 upshift request. The coast 1st pressure is maintained until the shift end time t4 as long as the variator transmission gear ratio is varied. A two stepped decreasing rate limiter is applied to the SEC pressure from time t4. The coast 1st pressure is decreased by the gradual gradient. The SEC pressure becomes the coast 2nd pressure at time t5. Then, the coast 2nd pressure is maintained while the gear position of the auxiliary transmission mechanism 30 is the second speed state.

Accordingly, at the accelerator foot release upshift deceleration, a hatching region shown by an arrow K is a deletion amount of the SEC pressure, relative to a case where the increasing amount J is maintained at the coast, as shown in FIG. 7. Consequently, it is possible to improve the fuel economy by this deletion amount.

(Accelerator Foot Release Downshift Vehicle Stop: FIG. 8)

In a case where the accelerator foot release operation and the brake depression operation are performed at the traveling when the gear position of the auxiliary transmission mechanism 30 is the second speed, the driving point (APO, VSP) is moved along G point→H point→I point, as shown in FIG. 3. The G point is a driving point in the second speed gear region. The H point is a position across the high speed mode lowest line HL/L on which the 2→1 downshift request is outputted. The I point is a vehicle stop position after the vehicle speed VSP is decreased along the coast line C/L.

In this way, as shown in FIG. 8, the accelerator foot release operation is performed at time t1 at the traveling when the gear position of the auxiliary transmission mechanism 30 is the second speed. At time t2, the brake depression operation is performed. With these, the SEC pressure is increased from the normal pressure to the coast 2nd pressure. That is, in a case where a required time period Δt from time t1 to time t2 is a minimum time period for the accelerator/brake depression switching, the pressure command of the SEC pressure is increased by a predetermined gradient in consideration of this minimum time period Δt. That is, the SEC pressure is started to be increased from time t1 by the predetermined gradient by which the SEC pressure becomes the coast 2nd pressure at time t2.

Then, at time t3, the 2→1 downshift is started based on the 2→1 downshift request. The coast 2nd pressure is maintained until the shift end time t5 as long as the variator transmission gear ratio is varied, although the vehicle stops at time t4. A two stepped decreasing rate limiter is not applied to the SEC pressure from time t5. The coast 2nd pressure is increased to the coast 1st pressure by a predetermined gradient.

Accordingly, at the accelerator foot release upshift deceleration, a hatching region shown by an arrow L is a deletion amount of the SEC pressure, relative to a case where the increasing amount J is maintained at the coast, as shown in FIG. 8. Consequently, it is possible to improve the fuel economy by this deletion amount.

[Coast Pulley Pressure Control Characteristic Operation]

In the embodiment, the increasing amount with respect to the belt capacity which is set when the accelerator opening degree APO is zero is controlled to be smaller as the transmission gear ratio of the auxiliary transmission mechanism 30 disposed in series with the variator 20 becomes the higher transmission gear ratio side.

That is, the increasing amount with respect to the belt capacity is set to be smaller as the transmission gear ratio of the auxiliary transmission mechanism 30 becomes the higher transmission gear ratio side. Accordingly, in a case where the transmission gear ratio of the auxiliary transmission mechanism 30 is not the lowest transmission gear ratio, the belt capacity is not unnecessary increased.

Therefore, in a case where the auxiliary transmission mechanism 30 is not the lowest transmission gear ratio during the coast traveling, it is possible to improve the fuel economy by suppressing the belt capacity to the low value.

In the embodiment, the increase of the belt capacity is finished by the timing when the braking force is generated after the accelerator opening degree APO becomes zero.

For example, when the braking force is generated before the increase of the belt capacity is finished, the braking torque is inputted from the driving wheel 7 to the belt 23 in a state where the belt capacity is deficient. Accordingly, the belt slippage may be generated.

On the other hand, the increase of the increase amount with respect to the belt capacity is finished by the timing when the torque is inputted from the driving wheel 7 to the belt 23 due to the generation of the braking force. With this, the belt slippage is prevented when the pedal depression switching operation by the driver by the accelerator release and the brake depression is performed.

Besides, it is not important when the increase of the increase amount is started and finished in a period after the accelerator opening degree APO becomes zero until the braking force is generated. That is, these may be in a period from a time when the accelerator opening degree APO becomes zero, to a time when the braking force is generated.

In the embodiment, the increase of the increase amount of the belt capacity is performed by increasing the primary pulley pressure and the secondary pulley pressure by the predetermined gradients.

For example, when the hydraulic pressures to the primary pulley 21 and the secondary pulley 22 are stepwisely increased to increase the belt capacity, the pressure difference between the both pulleys is temporarily decreased. In some cases, the pressure difference becomes zero. With this, the transmission gear ratio is varied during the increase of the belt capacity, so that the unnatural feeling is provided to the driver.

Contrary to this, the both pulley pressures are increased at the predetermined gradients, not in the stepped manner. With this, it is possible to suppress the variation of the transmission gear ratio, and to decrease the unnatural feeling to the driver.

In the embodiment, the increase of the belt capacity is started at the same time when the accelerator opening degree becomes zero. Moreover, the predetermined gradient is set to finish the increase of the increasing amount by the timing when the braking force is generated.

For example, in a case where the increasing gradient of the belt capacity is set to the large value so as to increase the belt capacity in the stepped manner, the variation of the transmission gear ratio is generated so as to provide the unnatural feeling to the driver.

Contrary to this, the time period during which the increasing gradient of the belt capacity is set is set to a longest time period in the time period from a time when the accelerator opening degree APO becomes zero, to a time when the braking force is generated. With this, it is possible to set the predetermined gradient to the smallest gradient.

Accordingly, the predetermined gradient for increasing the belt capacity is set to the smallest gradient. With this, it is possible to maximally suppress the variation of the transmission gear ratio, and suppress the unnatural feeling to the driver to the small amount.

Hereinafter, the "predetermined gradient" is explained. A shortest time period of the depression switching operation by the driver in the pedal depression switching operation in which the accelerator pedal depressed by the right foot is released, and then the brake pedal is depressed by the right foot is set (it is set based on the information previously obtained by the experiment and so on). The predetermined gradient is set so as to finish the increase of the increase amount during this shortest time period.

For example, the depressed accelerator pedal is released. Then, the state in which the both pedals are released is continued for some time. Then, the brake pedal is depressed. The predetermined time period is not set based on the pedal depression switching operation time period in the above-described situation.

It is not understand when the brake pedal is depressed after the release of the accelerator pedal. Accordingly, the predetermined gradient is set so as to finish the increase of the increasing amount in the situation in which the pedal depression switching operation time period becomes shortest. With this, it is possible to set the predetermined gradient to the smallest value, and to prevent the belt slippage in any pedal depression switching operation.

Next, Effects are Explained.

In the control device for the variator of the engine vehicle in the embodiment, it is possible to attain following effects.

(1) A control device for a continuously variable transmission mechanism of a vehicle (variator for an engine vehicle), the control device includes:

the continuously variable transmission mechanism (the variator 20) which is disposed between the engine 1 and the driving wheel 7, and in which a belt capacity of the primary pulley 21 and a belt capacity of the secondary pulley 22 are controlled by supplied hydraulic pressures being controlled;

the stepwise variable transmission mechanism (the auxiliary transmission mechanism 30) which is disposed in series with the continuously variable transmission mechanism (the variator 20), and which has at least two or more forward gear stages; and the control means (the transmission controller 12) configured to increase the belt capacities to be greater than the belt capacity set when the accelerator opening degree APO is zero, at least in a time period from a timing when the accelerator opening degree APO becomes zero, to a timing when a braking force is generated by a depression of a brake pedal, the control means (the transmission controller 12) being configured to set an increase amount with respect to the belt capacity set when the accelerator opening degree APO is zero, to a smaller value as a transmission gear ratio of the stepwise variable transmission mechanism (the auxiliary transmission mechanism 30) is higher.

Accordingly, it is possible to improve the fuel economy by suppressing the belt capacity to the low value when the stepwise variable transmission mechanism (the auxiliary transmission mechanism 30) is not the lowest transmission gear ratio during the coast traveling.

In this case, "at least in a time period from a timing when the accelerator opening degree APO becomes zero, to a timing when a braking force is generated by a depression of a brake pedal" includes an example in which the belt capacity is increased during a part of the above described time period, and an example in which the belt capacity is increased during all of the above described time period.

(2) The control means (the transmission controller 12) is configured to finish the increase of the belt capacity from the timing when the accelerator opening degree becomes zero by the timing when the braking force is generated.

Accordingly, it is possible to prevent the belt slippage at the pedal depression switching by the driver, in addition to the effect (1).

(3) The control means (the transmission controller 12) is configured to increase the primary pulley pressure (the PRI pressure) and the secondary pulley pressure (the SEC pressure) at the predetermined gradients, and thereby to increase the increase amount of the belt capacities.

Accordingly, the both pulley pressures (the PRI pressure and the SEC pressure) are increased at the predetermined gradients, not in the stepped manner. Consequently, it is possible to suppress the variation of the transmission gear ratio, and to decrease the unnatural feeling to the driver, in addition to the effect (2).

(4) The control means (the transmission controller 12) is configured to start the increase of the belt capacity at the same time when the accelerator opening degree APO becomes zero, and to set the predetermined gradient so that the increase of the increase amount is finished by the timing when the braking force is generated.

Accordingly, the predetermined gradient for increasing the belt capacity is set to the smallest gradient. Consequently, it is possible to maximally suppress the variation of the transmission gear ratio, and to suppress the unnatural feeling to the driver to the small amount.

Hereinbefore, the control device of the continuously variable transmission mechanism for the vehicle according to the present invention is explained with reference to the embodiment. However, the concrete configurations are not limited to this embodiment. Variations and additions of the design are allowable as long as it is not deviated from the gist of the invention relating to the claims.

In the embodiment, in the control means, the increasing amount with respect to the belt capacity set when the accelerator opening degree is zero is set to the smaller value as the transmission gear ratio of the auxiliary transmission mechanism 30 is the higher transmission gear ratio side, irrespective of the road surface frictional coefficient. Hereinafter, this reason are explained. The input torque to the belt by the depression of the brake pedal on the low μ road becomes larger than that of the normal road surface. On the low μ road, the rotation decreasing speed of the driving wheel is higher than that of the normal road surface when the braking is performed by the driver. In some cases, the driving wheel is locked on the low μ road. That is, the torque inputted from the driving wheel at the braking on the low μ road becomes greater than that of the normal road surface.

In this case, the belt capacity becomes deficient, so that the belt may be slipped. Accordingly, it is conceivable to perform this control only on the low μ road. However, in a case where the brake pedal is depressed suddenly after the accelerator pedal is released like a case where the forward signal is varied to red signal during the acceleration traveling, it is sensed whether or not the current road surface is the low μ road based on the release of the accelerator pedal. Then, in a case where the belt capacity is increased when the low μ road is sensed, the increase of the belt capacity is not in time by the generation of the braking force by the brake depression. Consequently, the belt slippage may be generated. Accordingly, the control in the embodiment is performed irrespective of the situation of the road surface.

However, in a case where it is sensed whether or not the road surface is the low μ road before the accelerator pedal is released, the control in the embodiment may be performed only on the low μ road. Consequently, the control in the embodiment is performed only on the low μ road on which the torque inputted from the driving wheel by the braking operation is large. Therefore, it is possible to prevent the belt slippage, and to prevent the unnecessary large belt capacity on the normal road surface. Moreover, it is possible to decrease the deterioration of the fuel economy due to the increase of the friction. As the sensing method of the road surface, for example, it is sensed whether or not the road surface is the low μ road by when the outside air temperature sensed by an outside air temperature is equal to or smaller than a predetermined temperature, or detection of the road surface state by an onboard camera (vehicle mounted camera).

In the embodiment, the stepwise variable transmission mechanism disposed in series with the continuously variable transmission is the auxiliary transmission mechanism 30 which has the two gear stages, and which is disposed at a position downstream of the variator 20. However, the stepwise variable transmission mechanism may be a transmission mechanism having a two or more gear stages. The stepwise variable transmission mechanism may be positioned at a position downstream or upstream of the continuously variable transmission mechanism.

In this embodiment, the control device for the continuously variable transmission mechanism of the vehicle according to the present invention is applied to the engine vehicle on which the continuously variable transmission with the auxiliary transmission is mounted. However, the control device according to the present invention is applicable to an electric vehicle provided with a motor generator which is a traveling drive source, and a hybrid vehicle provided with an engine and a motor generator which are traveling drive sources.

The invention claimed is:

1. A control device for a continuously variable transmission mechanism of a vehicle, the control device comprising:
   a continuously variable transmission mechanism which is disposed between a travelling drive source and a driving wheel, and in which a belt capacity of a primary pulley and a belt capacity of a secondary pulley are controlled by supplied hydraulic pressures being controlled;
   a stepwise variable transmission mechanism which is disposed in series with the continuously variable transmission mechanism, and which has at least two or more forward gear stages; and
   a controller configured to increase the belt capacities to be greater than the belt capacity set when an accelerator opening degree is zero, at least in a time period from a timing when the accelerator opening degree becomes zero, to a timing when a braking force is generated by a depression of a brake pedal, the controller being configured to set an increase amount with respect to the belt capacity set when the accelerator opening degree is zero, to a smaller value as a transmission gear ratio of the stepwise variable transmission mechanism is higher.

2. The control device for the continuously variable transmission mechanism of the vehicle as claimed in claim 1, wherein the controller is configured to finish the increase of the belt capacity from the timing when the accelerator opening degree becomes zero by the timing when the braking force is generated.

3. The control device for the continuously variable transmission mechanism of the vehicle as claimed in claim 2, wherein the controller is configured to increase the increase amount of the belt capacity with a predetermined gradient.

4. The control device for the continuously variable transmission mechanism of the vehicle as claimed in claim 3, wherein the controller is configured to start the increase of the belt capacity at the same time when the accelerator opening degree becomes zero, and to set the predetermined gradient so that the increase of the increase amount is finished by the timing when the braking force is generated.

5. A control method for a continuously variable transmission mechanism of a vehicle, which includes a continuously variable transmission mechanism which is disposed between a travelling drive source and a driving wheel, and in which a belt capacity of a primary pulley and a belt capacity of a secondary pulley are controlled by supplied hydraulic pressures being controlled, and a stepwise variable transmission mechanism which is disposed in series with the continuously variable transmission mechanism, and which has at least two or more forward gear stages, the control method comprising:

increasing the belt capacities to be greater than the belt capacity set when an accelerator opening degree is zero, at least in a time period from a timing when the accelerator opening degree becomes zero, to a timing when a braking force is generated by a depression of a brake pedal, and setting an increase amount with respect to the belt capacity set when the accelerator opening degree is zero, to a smaller value as a transmission gear ratio of the stepwise variable transmission mechanism is higher.

\* \* \* \* \*